| United States Patent [19] | [11] | 4,148,662 |
|---|---|---|
| Hughes et al. | [45] | Apr. 10, 1979 |

[54] BRICK COMPOSITION AND METHOD THEREFOR

[75] Inventors: John Hughes, Arlington Heights; Peter L. Maul, Addison, both of Ill.

[73] Assignee: American Colloid Company, Skokie, Ill.

[21] Appl. No.: 847,600

[22] Filed: Nov. 1, 1977

[51] Int. Cl.² ............................................. C04B 33/00
[52] U.S. Cl. ...................................................... 106/67
[58] Field of Search ............................. 106/67, 68, 71

[56] References Cited

U.S. PATENT DOCUMENTS 3,440,070  4/1969  Dewey ................................... 106/67
4,001,029  1/1977  Cassens ................................. 106/67

*Primary Examiner*—James Poer
*Attorney, Agent, or Firm*—Poms, Smith, Lande & Glenny

[57] ABSTRACT

This invention relates to a method for making brick from shale or a mixture of clay and shale by adding to the shale or shale mixture an additive containing sodium bentonite, a water soluble anionic polyelectrolyte polymer, and, preferably, a water soluble dispersant. The additive increases the plasticity and the green strength of the shale or shale mixture so that high quality bricks can be produced from such raw material.

16 Claims, No Drawings

BRICK COMPOSITION AND METHOD THEREFOR

BACKGROUND OF THE INVENTION

Bricks are produced from clay, finely pulverized shale or a mixture thereof, by extruding the raw material, shaping the extruded raw material and firing the shaped body. In certain areas, the raw material for producing the brick contains more than 50% shale (the remainder being clay). Because of the relatively small percentage of clay used in the brick, there is a lack of plasticity and a lack of green strength which causes a great many failures during the production process and after firing. Additionally, the lack of green strength and/or plasticity in the freshly extruded brick containing appreciable amounts of shale, causes in many cases, a deformity which results in an inferior brick which can only be sold at a significantly reduced price if it can be sold at all.

It is known that the addition of sodium bentonite to clay, in the manufacture of brick, will increase the plasticity; however, in those bricks containing more than 50% by weight of shale the addition of sodium bentonite does not appreciably aid in increasing the plasticity and green strength of bricks formed from this shale and therefore sodium bentonite is of little or no value in decreasing the number of rejects and increasing the green strength and/or plasticity of brick compositions containing relatively large amounts of shale, and particularly hard or petrified shale.

SUMMARY OF THE INVENTION

From the foregoing, it is readily apparent that it is a desideratum in the art to improve the yield of satisfactory bricks produced from raw material containing relatively large amounts of shale in a simple and economical manner. This is accomplished in the present invention by adding an additive to the brick raw material, said additive containing predominantly sodium bentonite and a minor amount of a water soluble anionic polyelectrolyte polymer and, preferably, a water soluble dispersant.

It is therefore the primary object of the present invention to disclose and provide a method for producing brick from a brick raw material containing more than 50% shale in which the number of rejects of the final brick is very small.

A further object of the present invention is to disclose and provide a method for increasing the plasticity and green strength of brick raw material containing an appreciable amount of shale by adding thereto an additive consisting essentially of sodium bentonite, a water soluble anionic polyelectrolyte polymer, and, optionally, a water soluble dispersing agent.

Other objects of the present invention will be apparent from the following detailed description of the preferred exemplary embodiments in which all parts or percentages are by weight unless expressly stated otherwise.

DESCRIPTION OF THE PREFERRED EMBODIMENTS

In the present preferred embodiments, reference will be made to face brick, however, it is to be understood that the present invention is also applicable to other types of brick.

The present invention is predicated upon the surprising discovery that a composition containing sodium bentonite, when added to brick or raw material containing 50% or more shale, will greatly enhance the plasticity of the brick raw material and the green strength of the raw material. The invention is particularly surprising when it is considered that sodium bentonite, even though having previously been used in producing brick, does not have any appreciable affect on the green strength or plasticity of brick raw material containing more than 50% shale. We have found however that if sodium bentonite is used in conjunction with a particular type of water soluble anionic polyelectrolyte, and, preferably a water soluble dispersant very good results are obtained.

The particular polyelectrolytes which have been found to be useful in the present invention are those polymers having carboxy groups along the chain such as carboxy acids, acetates, alcohols, anhydrides, hydrolyzed amides and hydrolyzed nitriles. By "hydrolyzed" we mean, for example, in the case of polyacrylonitrile that at least a portion of the nitrile groups (e.g. 40% to 95%) are converted to COOX where X is an anion such as —Na or —$NH_4$. Exemplary of water soluble polyelectrolytes are copolymers of maleic acid or maleic anhydride with acrylic acid, methacrylic acid, vinyl alcohol or vinyl acetate as well as polyvinyl alcohol and polyvinyl acetate and copolymers thereof. Other polyelectrolytes have been used to good effect on hydrolyzed polyacrylamide and polyacrylonitrile. Particularly preferred polymers are polyacrylic acid, polymethacrylic acid, copolymers thereof, and water soluble salts thereof such as the alkali metals (e.g. sodium) and ammonium salts.

As noted above, the sodium bentonite additive composition also, in addition to sodium bentonite and water soluble anionic polyelectrolyte polymers, preferably contains water soluble dispersants. Exemplary of water soluble dispersants which we have used to good effect are water soluble salts of phosphoric acid (phosphates) such as hypophosphate, orthophosphate, metaphosphate, and pyrophosphate. The particular cation forming the salt is unimportant providing that the resulting salt is water soluble. For example, the cation may be almost any metal salt such as an alkaline metal or an alkaline earth metal. Exemplary of the alkaline metal salts are sodium orthophosphate, tri-sodium orthophosphate, sodium metaphosphate, and sodium pyrophosphate. Other alkaline metals which are useful in producing phosphate salts which may be utilized in the present invention are potassium hydrophosphate, potassium pyrophosphate, and lithium phosphate. Exemplary of alkali earth metals is monocalcium phosphate.

Other water soluble dispersants useful in the present invention are the water soluble salts of leonardite, leonardite being a natural occurring mineral and is sometimes considered a naturally oxidized lignite which contains humic acid. Other water soluble dispersants useful in the present invention are the water soluble salts of, for example, lignonsulfonic acid, humic acid, or fulvic acid.

The composition of the sodium bentonite additive may vary to a great extent but preferably will contain from about 99.9% to 90% by weight of sodium bentonite and from about 0.1% to 5%, by weight, of the water soluble anionic polyelectrolyte polymer. It is preferred if the sodium bentonite additive also contains from about 0.1% to 5%, by weight, of the water soluble dispersant.

We have found that very small amounts of the brick additive, when added to the brick raw material, will greatly enhance the resulting plasticity and green strength of the brick. For example, we have used as little as 0.2%, by weight, of the bentonite additive, based on the combined weight of the dry brick raw material and bentonite additive, and have had very good results. In general, the amount of sodium bentonite additive added to the brick raw material is not critical and may vary from 0.2% to 10%, by weight. However, since the properties of the brick are not appreciably increased when over about 5% of the sodium bentonite additive is used, economy dictates that one would not use an excess of that amount except, as noted, there is no critical upper limit as to the amount of sodium bentonite additive. As has been noted hereinbefore, the present invention is particularly useful in brick containing more than 50%, by weight, of shale. Specifically, the raw material used for the brick in the present invention may be entirely finely pulverized shale or, alternatively, may be a mixture of clay and shale, the amount of clay in the mixture ranging from 50% to 0%, by weight. Since the clay used in brick making is well known in the art no detailed exemplification will be given herein because, in general, all types of clay and shale are used to make bricks but in general those clays are not as pure or as high grade as clays used for other industires.

The shales used in the present invention may be of any type and of every geological type and age including very hard shale and petrified shale.

As is also known in the art, face brick is produced by extruding brick raw material, then forming the extruded raw material and thereafter firing the formed brick. In the present invention, the sodium bentonite additive is added to the raw material (i.e. the shale or the mixture of shale and clay) prior to the extrusion step. The sodium bentonite additive may be added either in dry granular form or as an aqueous slurry or dispersion. Either manner is satisfactory since prior to the extrusion step water is added to the brick raw material in order to render the raw material plastic. The amount of water added depends upon the plasticity of the brick raw material and therefore the addition of water in the sodium bentonite slurry or dispersion is not disadvantageous since, in any event, water must be added to the brick raw material prior to extrusion.

In order to demonstrate the unexpected and unusual properties of the present invention, we have tested the sodium bentonite additive on a variety of shales having varying plasticities. In this regard, it is noted that increases in plasticity can be directly measured on freshly produced bricks through the use of various types of greeen strength testing equipment. This apparatus measures the plasticity as "pounds of load required to fail" or the apparatus may measure plasticity on a dimensionless scale which allows comparisons. Common green strength testers load the raw brick until the brick cracks or ruptures.

Another means of measuring plasticity is to use the same type of strength tester after the brick has been dried. This measurement is known as a "Dry Modulus of Rupture" (dry MOR). An indirect measure of the binding power of the sodium bentonite additives is the recovery of high grade bricks after firing. That is, the percentage of good bricks versus the percentage of bad bricks.

We have run both laboratory and plant tests on our sodium bentonite additive. The following Tables illustrate the unusual and surprising results utilizing our invention. In the following Tables, Additive A has the following composition: 1.5%, by weight, of sodium acid pyrophosphate; 0.5% sodium polyacrolate; and 98%, by weight, of sodium bentonite. In the following Table Additive B had the following composition: 0.25%, by weight, of sodium acid pyrophosphate; 1% sodium polyacrolate; and 98.5%, by weight, of sodium bentonite. The composition of the bodies (i.e. the brick raw material) was in all cases at least 80% shale and in some instances 100% shale such as body 4. Table I measures the DRY MOR in pounds per square inch, as explained above, Table II measures the green strength, and Table III measures the recovery of good brick. In other words, in Table III, if the recovery is listed as 96%, this means that 96% of the bricks produced were of acceptable quality.

It should be noted that in Tables I, II, and III the additive was added dry to the brick raw material.

TABLE I

| Body | Native MOR | 1% Binder A | 1% Binder B | 2% Binder A | 2% Binder B | % Increase MOR Binder A | % Increase MOR Binder B |
|---|---|---|---|---|---|---|---|
| 1 | 162 | | | 607 | 785 | 275% | 383% |
| 2 | 158 | 291 | 330 | | | 85% | 109% |
| 2 | 158 | | | 670 | 724 | 324% | 358% |
| 3 | 506 | | | 785 | 820 | 55% | 62% |
| 4 | 31 | | | 252 | 267 | 713% | 761% |

TABLE II

| Body | Native Score | 1% Binder A | 1% Binder B | 2% Binder A | 2% Binder B | % Increase MOR Binder A | % Increase MOR Binder B |
|---|---|---|---|---|---|---|---|
| 5 | 3.1 | 3.9 | 4.4 | | | 30% | 42% |
| 5 | 3.1 | | | 4.9 | 6.2 | 53% | 114% |

TABLE III

| Body | Without Bentonite | 1% Binder A | 1% Binder B | 2% Binder A | 2% Binder B |
|---|---|---|---|---|---|
| 5 | 79.0% | 96% | 94% | | |
| 5 | 79.2% | | | 99% | 96% |
| 6 | 80.4% | 95.5% | 94% | | |

As is apparent from the foregoing tables, the addition of the bentonite additive increases the dry MOR by from 62% to 761%; increases the green strength by from 42% to 114% and materially increases the amount of quality bricks. The surprising results obtained by the present invention when the bentonite additive is added to the brick raw material as a slurry is shown in Tables IV and V.

TABLE IV

| | GREEN STRENGTH (Pounds to Fail) | | |
|---|---|---|---|
| Body | Native Green Strength | 0.4% Binder A | 0.4% Binder B |
| 7 | 24 lbs. | 47 lbs. | 50 lbs. |

TABLE V

| | RECOVERY | | |
|---|---|---|---|
| Body | Without Bentonite | 0.4% Binder A | 0.4% Binder A |
| 7 | 86.3% | 92.3% | 92.5% |

As is apparent from Tables IV and V, the green strength and amount of quality bricks is appreciably increased when only 0.4%, by weight, of the additive is added as a bentonite slurry to the brick raw material.

In the foregoing exemplary embodiment, sodium polyacrylate and sodium acid pyrophosphate were used; however, we have used other water soluble polyelectrolytes and water soluble dispersants with equally as good effect, the foregoing exemplary embodiments being for exemplification only and are not to be considered limiting.

We claim:

1. A method for producing brick which comprises intimately admixing (A) a brick raw material consisting essentially of from 50% to 100%, by weight, of shale and from 50% to 0%, by weight, of clay and (B) a sodium bentonite additive composition consisting essentially of from 99.9% to 90%, by weight, of sodium bentonite and from 0.1% to 5%, by weight, of a water soluble anionic polyelectrolyte polymer; and forming a brick from the resultant admixture.

2. A method according to claim 1 wherein the sodium bentonite additive contains from 0.1% to 5%, by weight, of a water soluble dispersant.

3. A method according to claim 1 wherein the amount of sodium bentonite additive admixture with the brick raw material is between 0.2% to 10%, by weight.

4. A method according to claim 3 wherein the water soluble anionic polyelectrolyte polymer is a member selected from the group consisting of copolymers of maleic acid or maleic anhydride with acrylic acid, methacrylic acid, vinyl alcohol and vinyl acetate; polyvinyl alcohol, polyvinyl acetate, copolymer of polyvinyl alcohol and polyvinyl acetate, hydrolyzed polyacrylamide, polyacrylonitrile, polyacrylic acid, water salts of polyacrylic acid, polymethacrylic acid, water soluble salts of polymethacrylic acid, copolymer of polyacrylic acid and polymethacrylic acid and the water soluble salts thereof.

5. A method according to claim 4 wherein the water soluble anionic polyelectrolyte polymer is a member selected from the group consisting of polyacrylic acid, polymethacrylic acid, copolymer thereof and the water soluble salt thereof.

6. A method according to claim 5 wherein the water soluble anionic polyelectrolyte polymer is sodium polyacrylate.

7. A method according to claim 2 wherein the water soluble dispersant is a water soluble walt of phosphoric acid.

8. A method according to claim 7 wherein the water soluble salt of phosphoric acid is sodium acid pyrophosphate.

9. An unfired brick composition consisting essentially of intimate admixure of (A) a brick raw material consisting essentially of 50% to 100%, by weight, of shale and from, 50% to 0%, by weight, of clay and (B) a sodium bentonite additive composition consisting essentially of from 99.9% to 90% by weight of sodium bentonite and from 0.1% to 5%, by weight, of a water soluble anionic polyelectrolyte polymer.

10. A brick composition according to claim 9 wherein the sodium bentonite additive contains from 0.1% to 5%, by weight, of a water soluble dispersant.

11. A brick composition according to claim 9 wherein the amount of sodium bentonite admixture in the brick composition is between 0.2% to 10%, by weight.

12. A brick composition according to claim 11 wherein the water soluble anionic polyelectrolyte polymer is a member selected from the group consisting of copolymers of maleic acid or maleic anhydride with acrylic acid, methacrylic acid, vinyl alcohol and vinyl acetate; polyvinyl alcohol, polyvinyl acetate, copolymer of polyvinyl alcohol and polyvinyl acetate, hydrolyzed polyacrylamine, polyacrylonitrile, polyacrylic acid, water salts of polyacrylic acid, polymethacrylic acid, water soluble salts of polymethacrylic acid, copolymer of polyacrylic acid and polymethacrylic acid and the water soluble salts thereof.

13. A brick composition according to claim 12 wherein the water soluble anionic polyelectrolyte polymer is a member selected from the group consisting of polyacrylic acid, polymethacrylic acid, copolymers thereof and the water soluble salt thereof.

14. A brick composition according to claim 13 wherein the water soluble anionic polyelectrolyte polymer is sodium polyacrylate.

15. A composition according to claim 10 wherein the water soluble dispersant is a water soluble salt of phosphoric acid.

16. A brick composition according to claim 15 wherein the water soluble salt of phosphoric acid is sodium acid pyrophosphate.

* * * * *

UNITED STATES PATENT AND TRADEMARK OFFICE
CERTIFICATE OF CORRECTION

PATENT NO. : 4,148,662
DATED : April 10, 1979
INVENTOR(S) : John Hughes and Peter L. Maul It is certified that error appears in the above-identified patent and that said Letters Patent are hereby corrected as shown below:

Column 3, line 29: "industires" should be --industries--.

Column 4, line 4: "greeen" should be --green--.

Claim 7, line 2: "walt" should be --salt--.

Signed and Sealed this

Twenty-eighth Day of August 1979

[SEAL]

Attest:

*Attesting Officer*

LUTRELLE F. PARKER
*Acting Commissioner of Patents and Trademarks*